(12) United States Patent
Smith et al.

(10) Patent No.: US 11,858,636 B2
(45) Date of Patent: Jan. 2, 2024

(54) RESCUE BASKET

(71) Applicant: The Government of the United States of America, as represented by the Secretary of Homeland Security, Washington, DC (US)

(72) Inventors: Spencer Smith, Washington, DC (US); Riely Brande, Washington, DC (US); Nolan Richerson, Washington, DC (US); Benjamin Crutchfield, Washington, DC (US); Christian Breviario, Washington, DC (US); Ronald Adrezin, East Lyme, CT (US); Michael Plumley, Washington, DC (US); Marion Lewandowski, Old Saybrook, CT (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 1236 days.

(21) Appl. No.: 16/368,013

(22) Filed: Mar. 28, 2019

(65) Prior Publication Data
US 2020/0148359 A1    May 14, 2020

Related U.S. Application Data

(60) Provisional application No. 62/758,133, filed on Nov. 9, 2018.

(51) Int. Cl.
*B64D 1/22*    (2006.01)
*B63C 9/26*    (2006.01)
*B63C 9/01*    (2006.01)

(52) U.S. Cl.
CPC .............. *B64D 1/22* (2013.01); *B63C 9/01* (2013.01); *B63C 9/26* (2013.01); *B63C 2009/265* (2013.01)

(58) Field of Classification Search
CPC ....... B63C 9/01; B63C 9/26; B63C 2009/265; B64D 1/22; A62B 1/02; B65D 1/38
See application file for complete search history.

(56) References Cited

U.S. PATENT DOCUMENTS 2,738,939 A * 3/1956 Johnson .................. B64D 1/22
                                                               441/83
4,124,181 A * 11/1978 Kolwey .................. B64D 1/22
                                                               258/1.2

(Continued)

FOREIGN PATENT DOCUMENTS

BR    202014003638-0 Y1    12/2019
CA          1289819 C  * 10/1991  ............. B63C 7/003

(Continued)

OTHER PUBLICATIONS

Life Support International Website—Rescue Net, Billy Pugh X-872-SF; https://lifesupportintl.com/products/res-1402-00, accessed on Apr. 20, 2021.

(Continued)

*Primary Examiner* — Nicholas McFall
(74) *Attorney, Agent, or Firm* — Lavanya Ratnam; Robert W. Busby; Kelly G. Hyndman

(57) ABSTRACT

A rescue basket having the capacity to safely hold two full-sized individuals increases the efficiency and effectiveness of helicopter water rescue and recovery operations. The rescue basket includes an open end, which affords an additional option for loading passengers, along with a door mechanism that can at least partially close off the open end for passenger safety. The rescue basket includes a flotation system that maintains the basket at a desired flotation level (Continued)

when completely immersed in water, along with sufficient reserve buoyancy to safely maintain the passengers above water when loaded. Methods of performing a water rescue utilizing the present rescue basket on board of a helicopter are also provided.

23 Claims, 7 Drawing Sheets

(56) References Cited

U.S. PATENT DOCUMENTS

| | | | |
|---|---|---|---|
| 4,564,161 A | | 1/1986 | Frye |
| 4,583,617 A | | 4/1986 | Berger |
| 4,627,821 A | | 12/1986 | Bradley et al. |
| 4,773,887 A | * | 9/1988 | Steffanus .................. B63C 9/28 441/80 |
| 5,086,998 A | | 2/1992 | Pelas |
| 5,344,203 A | * | 9/1994 | Tollenaere ............... B64D 1/22 294/68.1 |
| 5,375,795 A | | 12/1994 | Strunk |
| 8,292,229 B2 | | 10/2012 | Pancotti et al. |
| 9,517,170 B1 | | 12/2016 | Sawatzky |
| 2012/0286094 A1 | | 11/2012 | Petsche et al. |
| 2018/0255761 A1 | * | 9/2018 | Paoluccio ............. A01M 1/226 |

FOREIGN PATENT DOCUMENTS

| | | | | |
|---|---|---|---|---|
| CN | 206371762 | * | 8/2017 | |
| EP | 1 336 560 B1 | | 6/2008 | |
| FR | 2859700 B1 | | 6/2006 | |
| JP | 6581555 B2 | | 9/2019 | |
| KR | 20090000547 U | * | 1/2009 | |
| SE | 512203 C2 | * | 2/2000 | ............... B63C 9/01 |
| SE | 512203 C2 | | 2/2000 | |

OTHER PUBLICATIONS

Life Support International Website—Rescue Basket, Collapsible, https://lifesupportintl.com/products/res-0495-00, accessed on Apr. 20, 2021.
Lifesaving Systems Corp. Website, https://lifesavingsystems.com/product/helicopter-rescue-basket-chinook, accessed on Apr. 20, 2021.
Lifesaving Systems Corp. Rescue & Survival Equipment Catalog, https://lifesavingsystems.com/store/lifesaving-systems-catalog.pdf, 2015.
Lift Shield, Cranetainer System US Website, http://www.cranetainersystem.com/lift-shield/, accessed on Apr. 20, 2021.
Rescue Man Basket, Lifting Technologies Webiste, https://www.lifttech.com/rescue-man-basket, accessed on Apr. 20, 2021.

* cited by examiner

Prior Art

RESCUE BASKET

CROSS-REFERENCE TO RELATED APPLICATIONS

This application claims priority to U.S. Provisional Application 62/758,133, filed Nov. 9, 2018, which is incorporated by reference in its entirety.

GOVERNMENT INTEREST

The subject matter of this disclosure was made with support from the United States Department of Homeland Security (DHS). The Government of the United States of America has certain rights in this invention.

FIELD

The invention relates to a rescue basket for suspension from a helicopter and the like, generally used for lifting people, bodies or other objects from water in rescue and recovery operations.

BACKGROUND

Rescuers often use rescue baskets during ground and water rescue operations. The rescue basket, typically suspended from a helicopter by a cable and hoist, lifts a person up from the ground or water into the helicopter. The United States Coast Guard often use helicopters having the MH-60 airframe, such as MH-60 Jayhawk helicopters, for ground and maritime rescue.

Rescue baskets are generally constructed of a sturdy, light-weight, open frame manufactured from stainless steel tubing or like material, including both longitudinal and transverse components that are secured by welding or the like into an integral unit. The rescue baskets also have an attachment point for a tether such as a rope or cable or the like, which allow rescue personnel to either raise or lower the basket.

Speed in rescue operations is important. Major hurricanes impacting the world and open shipping lanes in the artic throughout many months of the year highlight the need for assets capable of performing maritime rescue as quickly and efficiently as possible. The ability to respond to mass rescue incidents is somewhat limited in the methods available to remove large numbers of people from a hazardous marine situation quickly and safely. Known rescue baskets are largely limited in that they can safely hold only a single individual and/or about 300 pounds. Known rescue baskets are also generally designed as a one-piece combined solid frame, and in use, the individual passengers must be loaded into the basket over the sides. The single passenger capacity and limited options for loading hamper the speed and safety of maritime rescue operations.

The present disclosure provides a design for a rescue basket and system that increases the efficiency and effectiveness of water rescues. The rescue basket and system can save a large number of people in an emergency situation, such as a massive marine casualty (e.g. a cruise ship sinking) or a rescue response to a hurricane (e.g. saving multiple people quickly from rooftops). The rescue basket and system can also save multiple people in a single hoist, greatly expediting rescue.

SUMMARY

The present disclosure describes a rescue basket and an efficient and effective rescue system adapted to use the lifting capabilities of a helicopter platform. The system utilizes an improved rescue basket design that can save more people in a shorter amount of time compared to the existing art. The present rescue system is designed primarily for water rescue and can be integrated with existing helicopter rescue systems, such as those utilizing the MH-60 helicopter airframe.

According to various embodiments, the rescue basket includes a rigid, structural frame having a substantially rectangular structure that includes a first end, a second end, two sides, a bottom and an open top defining a basket cavity having an inside volume capable of holding two full-sized individuals, a door mechanism positioned at the first end of the frame, and a flotation system having sufficient buoyancy to keep the basket afloat and maintain the basket at a desired flotation level when completely immersed in the water. The rescue basket is designed for use suspended by a cable from a helicopter and the like. The frame is designed with dimensions roomy enough to comfortably hold two full-sized individuals and to hold at least 600 pounds when lifted from the water. The design also maximizes the space dimensions of the basket in view of the dimensions of the MH-60 helicopter cabin.

The present rescue basket with a door mechanism positioned at one end of the basket provides an alternative option for loading passengers into the basket through the doorway instead of or in addition to loading over the sides of the basket. This makes the basket more accessible, allows passengers and rescuers safe and more expeditious access and egress to and from the basket, and decreases the amount of time needed per hoisting evolution. The door mechanism also adds another means of entry to the basket that is easier for people who may be injured, unconscious, or have limited mobility.

According to various embodiments of the rescue basket, the structural frame includes generally rectangular shaped side rails that define a side periphery of the frame. Each of the side rails extend vertically up the perimeter of a first end of the frame, turn and continue horizontally along a top perimeter of the frame, turn and extend vertically down an end perimeter of the second end of the frame, and then turn and continue horizontally along a bottom perimeter of the frame and return back to the first end. Each of the side rails can be constructed as one single continuous rail, or can be constructed from more than one rail that are attached together, such as by welding, to form a continuous rail.

In various embodiments, the structural frame includes one or more end rails attached to the frame at the second end, spanning horizontally between a pair of the side rails, and enclosing the second end. The first end of the frame, opposite of the second end, remains open and includes a door mechanism that at least partially encloses the first end.

In various embodiments, the basket frame includes additional structural elements, such as a middle side rail extending vertically up each side of the frame. The middle side rail is positioned generally perpendicular to the horizontal top and bottom perimeter portions of the side rails, and generally bisecting the side rails. In various embodiments, the basket frame includes one or more bottom runners extending longitudinally along the length of the bottom of the frame, and one or more transverse support bars extending across the width of the bottom of the frame, spanning between the pair of side rails.

According to various embodiments, the sides of the basket frame include one or more diagonal support tubes extending vertically and diagonally up from the bottom perimeter of the side rail to the top perimeter of the side rail, each of the diagonal support tubes being supported by a corresponding vertical support tube extending vertically between the bottom perimeter of the side rail to the diagonal support tube.

According to various embodiments, the rescue basket includes a flotation system that benefits from increased buoyancy and improved stability. In some embodiments, the flotation system includes one or more floats positioned along one or more sides and/or ends of the basket. The floats are supported against the frame and/or the frame itself acts as an internal support for the floats. The floats provide improved stability with reduced bulkiness, and therefore increase the amount of reserve buoyancy to the basket. The floats also maintain the basket at a desired flotation level when immersed in water. The floats can also allow for increased comfort of passengers within the basket, as they may be surrounded by buoyant material on all sides.

According to various embodiments, methods of water rescue are performed by providing a rescue basket on board of a helicopter, attaching the rescue basket to a cable associated with a hoist on the helicopter, lowering the rescue basket from the helicopter into the water near the rescuees, loading one or more rescuees into the rescue basket through an open end of the basket, sliding a crossbar along a frame of the basket to close the open end of the basket, and hoisting the rescue basket containing the rescuees up and into the helicopter. In some embodiments of the method, two rescuees are loaded into the rescue basket before hoisting the basket up to the helicopter.

In use under normal water-rescue conditions, the present rescue basket will be lowered by way of a cable and hoist from a helicopter into the water near the rescuees, the basket being lowered until the cable becomes slack and the basket is floating. At least some of the basket will be suspended below the water surface (e.g. the bottom of the basket and a portion of the sides). One or more passengers are loaded into the basket either through the open door end of the basket, or loaded over the side of the basket, and the basket is hoisted back up and into the helicopter cabin. The one or more passengers are then unloaded and the basket can quickly return to the water for additional rescue operations.

BRIEF DESCRIPTION OF THE DRAWINGS

An appreciation of the disclosure and many attendant advantages thereof may be understood by reference to the accompanying drawings. Included in the drawings are the following figures.

DETAILED DESCRIPTION

Figure 1:
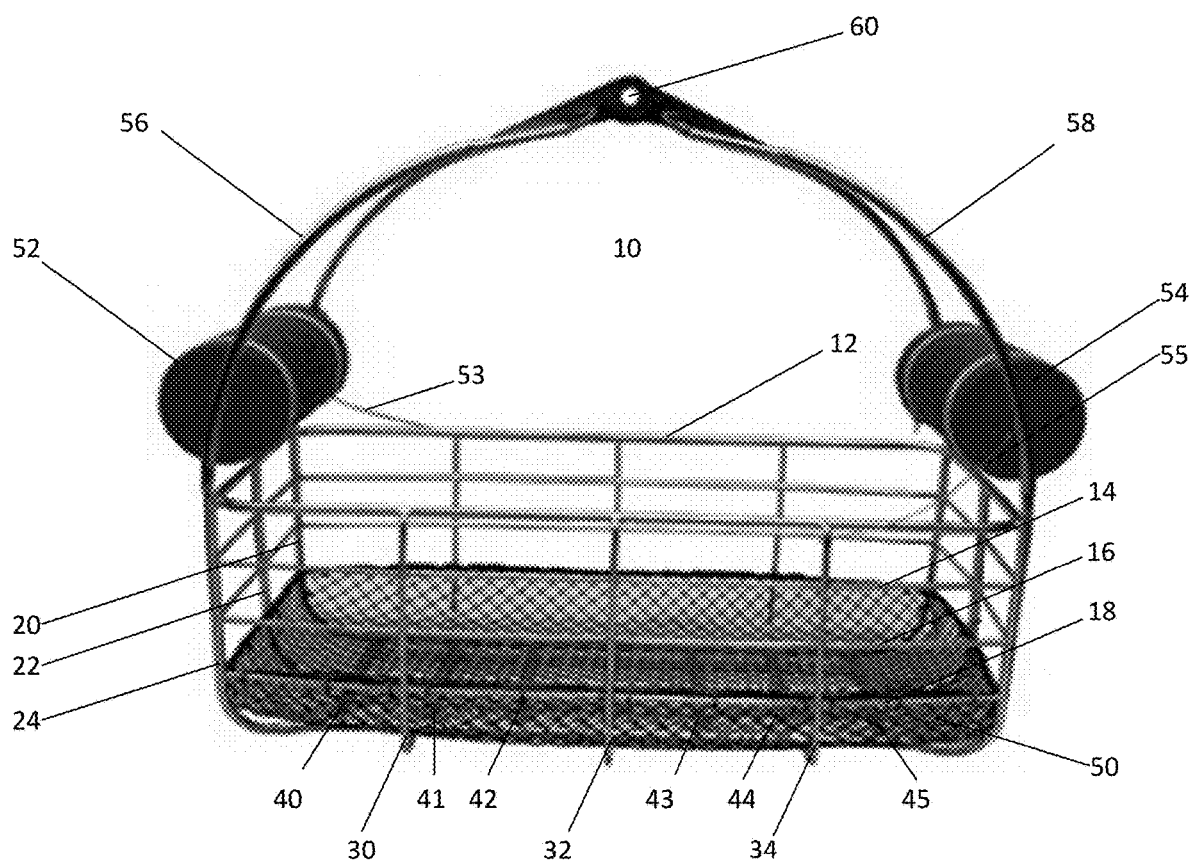
FIG. 1 is a perspective view of a single-person rescue basket according to the prior art.

With reference to the drawing figures, FIG. 1 illustrates a rescue basket known in the prior art (Life Support International, Product RES-0499-00). The rescue basket 10 is made of a sturdy, lightweight framework of 304 stainless steel welded together to form a substantially rectangular cage-like structure. The rescue basket 10 is also provided with an attachment means (bail assembly) for a helicopter winch cable or the like, and buoyancy floats.

The tubular elements and cross bars in the rescue basket 10 shown in FIG. 1 define a solid structural frame that is enclosed along all four sides and the bottom. The rescue basket 10 has a generally rectangular, horizontal top rail 12 extending longitudinally around the upper perimeter of the basket, defining the opening into the basket cavity. Below top rail 12, basket 10 has corresponding generally rectangular, horizontal side rails 14, 16, and 18 extending longitudinally around the entire perimeter of the basket 10, further enclosing the four sides of the basket cage and further defining the basket cavity.

Further enclosing the four sides of the basket cage, bottom runners 20, 22 and 24 extend vertically up each end, and extend horizontally along the length of the bottom of basket 10. Further enclosing the four sides of the basket cage, transverse runners 30, 32 and 34 extend vertically up the sides of basket 10 and across the width of the bottom, attaching to top rail 12. Basket 10 also has several transverse support bars 40-45 extending across the bottom runners 20, 22 and 24, providing additional structure to the bottom of the basket.

A net liner 50 covers the bottom of basket 10. The basket 10 also includes two cylindrical floats 52 and 54 positioned at each end of basket 10, the floats held in place by metal rods 53 and 55 attached to the frame and boring through the center of each float. The basket 10 features a bail assembly with a pair of handles 56 and 58 and a ring 60 for a cable and hoist attachment.

Rescue basket 10 has a basket cavity large enough to accommodate a single person (e.g. 44.5" L×25" W×20" H) with a working load limit of 600 pounds. Rescue basket 10 also defines a structural frame that is solidly enclosed on all four sides.

Figure 2:
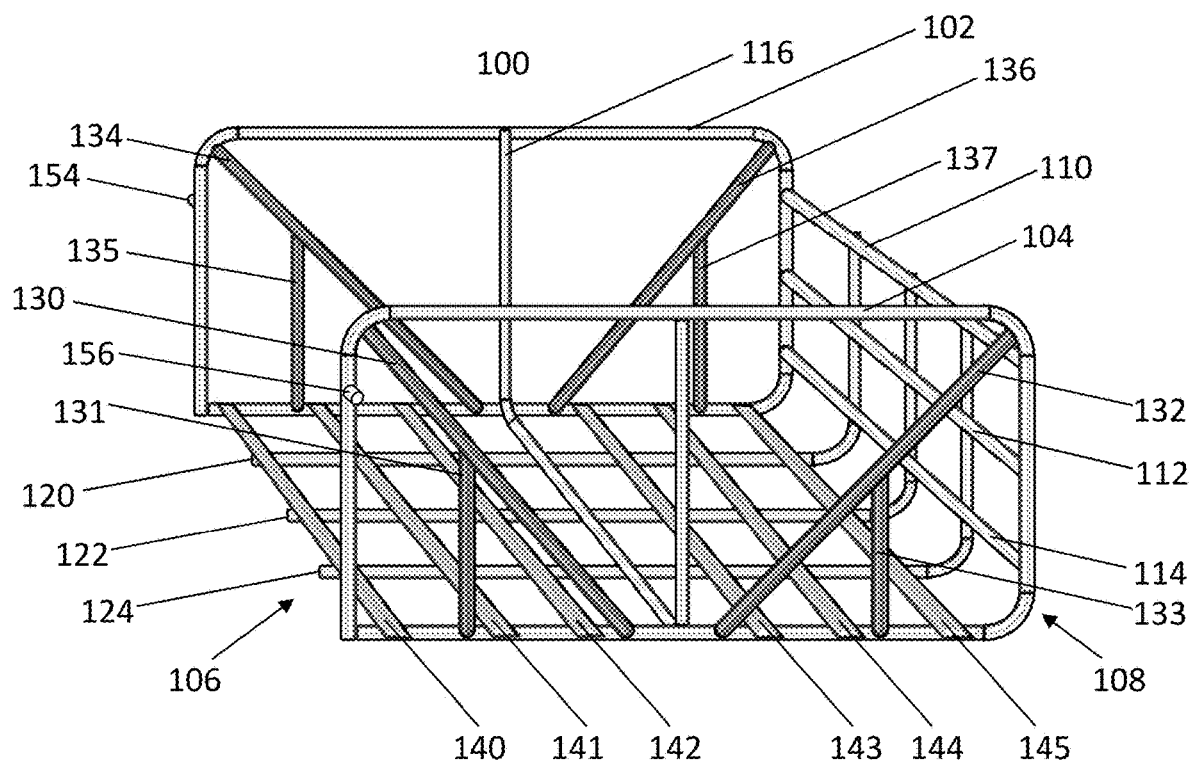
FIG. 2 is a perspective view of a two-person rescue basket according to an exemplary embodiment of the present invention.

FIG. 2 illustrates a rescue basket 100 according to an embodiment of the present invention. Rescue basket 100 has a substantially rectangular cage structure that includes two ends, two sides, a bottom, and an open top defining a basket cavity.

According to this embodiment, basket 100 has generally rectangular peripheral edge side rails 102 and 104 extending vertically up the perimeter of a first end 106 of the basket 100, continuing horizontally along the top perimeter of the basket 100, extending vertically down the perimeter of a second end 108 of the basket 100, and then continuing horizontally along the bottom perimeter of the basket 100, back to the first end 106.

At second end 108 of basket 100, end rails 110, 112 and 114 extend horizontally, spanning between side rails 102, 104. A middle side rail 116 extends vertically up each side and horizontally across the bottom of basket 100. The vertical portion of middle side rail 116 extends generally perpendicular to the horizontal top and bottom perimeter portions of each of side rails 102, 104 and the horizontal portion of middle side rail 116 extends along the bottom of the basket, spanning between side rails 102, 104. The middle side rail 116 generally bisects each of the side rails 102, 104.

Bottom runners 120, 122 and 124 extend longitudinally along the length of the bottom of basket 100, and then continue to extend vertically up the second end 108 of basket 100.

A plurality of transverse support bars 140-145 extends across the width of the bottom of basket 100, spanning between side rails 102, 104.

On the sides, basket 100 has diagonal support tubes 130, 132, 134 and 136, along with vertical support tubes 131, 133, 135 and 137. Diagonal support tubes 130, 132 extend vertically and diagonally up from the bottom perimeter of side rail 104 to the top perimeter of side rail 104. Each of diagonal support tubes 130, 132 is further supported by a vertical support tube 131, 133 respectively, extending vertically between the bottom perimeter of side rail 104 and diagonal support tubes 130, 132. Similarly, diagonal support tubes 134, 136 extend vertically and diagonally up from the bottom perimeter of side rail 102 to the top perimeter of side rail 102, and each is supported by a vertical support tube 135, 137 respectively. The inside angle formed by the diagonal support tube (e.g. 132) and the bottom perimeter portion of the side rail (e.g. 104) can be about 35 to 60 degrees, or about 40 to 50 degrees, or about 45 degrees. The inside angle formed by diagonal support tube (e.g. 132) and its corresponding vertical support tube (e.g. 133) can be about 35 to 60 degrees, or about 40 to 50 degrees, or about 45 degrees.

This diagonal and vertical support tube arrangement on the sides of the present rescue basket reduces the weight of the basket while providing at least as much or more structural integrity and load bearing capacity than the single-person baskets known in the art. This allows the dimensions of the present basket frame to be increased to sufficiently accommodate two full-sized individuals, while keeping the total weight of the basket low enough to be easily maneuvered by the rescuers, maintain the desired buoyancy in the water and not exceed the hoisting capacity of the helicopter.

Each of the various structural components of the present rescue basket frame, such as the side rails, end rails, bottom runners, support bars and support tubes, can be constructed as a single continuous element, or can be constructed of two or more parts attached together by conventional means, such as clamped, bolted or welded together. Furthermore, the various structural components of the frame can be attached to other structural components by conventional means, such as clamped, bolted or welded together.

While the structure of the second end 108 of basket 100 is closed off by end rails 110, 112, 114 and the vertically extending bottom runners 120, 122, 124, the first end 106 of basket 100 remains open. According to various embodiments, the first end 106 is at least partially "closed off" by a door mechanism.

Figure 3:
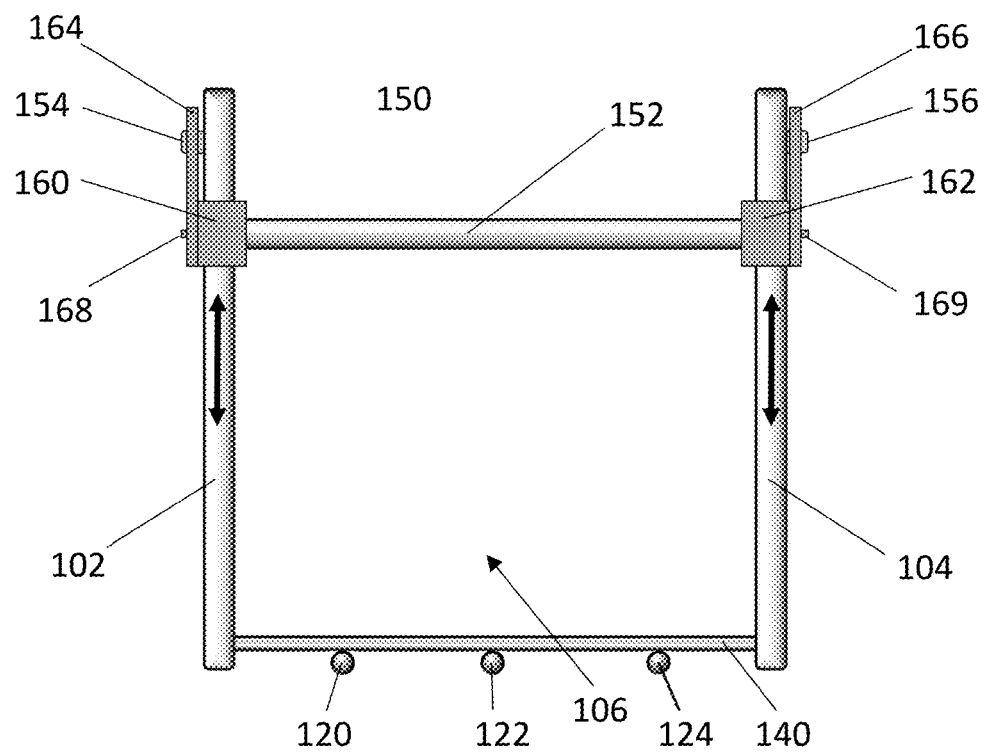
FIG. 3 is an end view of the rescue basket according to an exemplary embodiment of the present invention, and illustrates a door mechanism located at a first end of the rescue basket.
Figure 4:
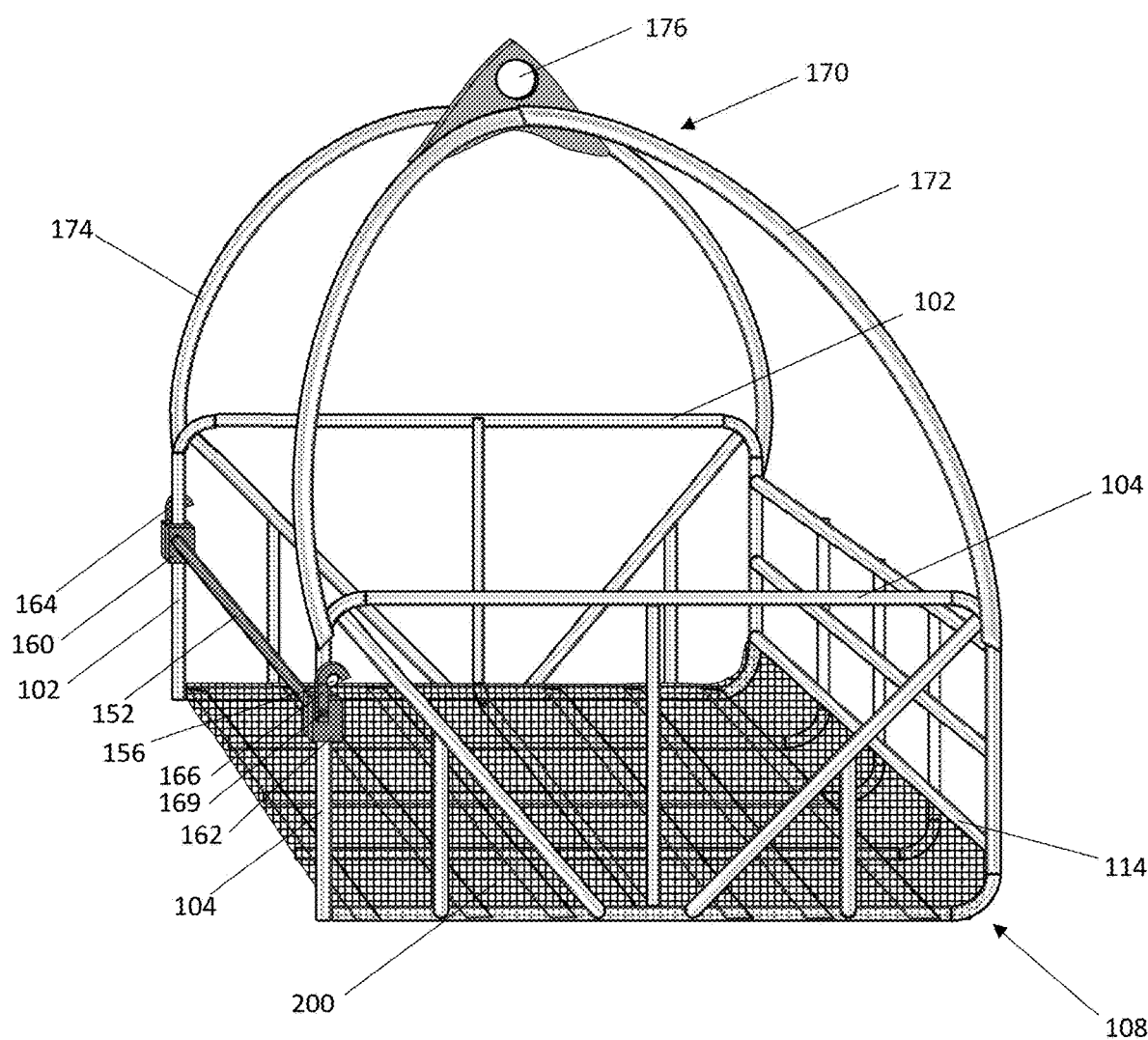
FIG. 4 is a perspective view of a rescue basket having a net liner, door mechanism, and bail assembly according to an exemplary embodiment of the present invention.

In an embodiment, illustrated in FIG. 3 and FIG. 4, the door mechanism 150 includes a crossbar 152 spanning across the open first end 106, from side rail 102 to side rail 104. At each end of crossbar 152 is a latch, such as a hook 164, 166. The door mechanism 150 also includes bushings, such as ball bushings (e.g., NB TW10UU ⅝ inch self-aligning ball bushings, NB SW10⅝ inch ball bushings; VXB Ball Bearings) at each end of crossbar 152 that allow crossbar 152 to easily slide up and down side rails 102, 104. In an embodiment, the bushings are inside of a housing 160 and 162.

In one embodiment, hooks 164, 166 are connected to crossbar 152 so that both hooks can be moved at the same time. In an embodiment, hooks 164, 166 are connected by connectors 168 and 169 to each end of crossbar 152. In various embodiments, connectors 168, 169 are connecting rods, bolts or the like.

To close the door mechanism, crossbar 152 slides on side rails 102, 104 to a position near the top of the basket 100, and then rotates so that hooks 164, 166 hook onto posts 154 and 156 on side rails 102, 104, to hold and latch or lock the crossbar 152 in position across the first end 106 of the basket. According to an embodiment, one or more springs (e.g. torsion springs) bias the hooks 164, 166 toward a locking position over posts 154, 156. According to various embodiments, other types of latches or latching mechanisms can be used to latch or lock the crossbar in position, such as magnets, friction clamps, or ratchets.

According to an embodiment, the components of the door mechanism, such as the bushings, springs and housing are removable for ease of maintenance and replacement.

According to an embodiment, the rescue basket includes a latching mechanism that prevents the door from unintentionally releasing, or without human interaction, when in the raised or closed positioned.

According to various embodiments, the door mechanism can include a crossbar as disclosed and illustrated, but in some embodiments, the door mechanism can include a flat panel, a mesh panel, a chain, or the like as another means to at least partially close the open end 106 of the basket, and each of these is included under the definition of "crossbar" used herein.

In an embodiment, the basket includes a mesh netting material attached to the bottom of the frame at the open first end 106, such as to transverse crossbar 140, and attached to the crossbar 152. When the crossbar is raised to the "closed" position, the mesh netting material is extended and/or stretched to cover the open first end 106.

According to various embodiments shown in FIG. 4, the rescue basket includes a bail assembly 170 for attachment to a hoist. Bail assembly 170 includes one or more bail arms 172 and 174, and an attachment ring 176 for attachment to a cable and hoist.

The structural elements of the basket frame can be made of any suitable lightweight material, such as plastic, carbon fiber, aluminum, titanium, magnesium or stainless steel. In an exemplary embodiment, the frame utilizes 304 stainless steel because it is able to withstand the harsh environment of marine search and rescue missions in terms of corrosion and strength. The rescue basket can include frame members and cross bars made of a combination of different materials, such as stainless steel and aluminum. In an embodiment, the basket frame has frame members and cross bars made of 304 stainless steel while all or portions of the door mechanism are made of aluminum. The frame members and cross bars described above are constructed of tubular or other suitable shaped metal members and welded or bolted together.

According to various embodiments, as shown in FIG. 4, the rescue basket can include a net liner 200 at least partially covering the bottom of the basket. In some embodiments, net liner 200 includes strips of interwoven Nylon or like webbing material, or a wire mesh having about 1-2 inch apertures. In some embodiments, in addition to at least partially covering the bottom of the basket, net liner 200 can also roll up and at least partially cover the sides and/or second end 108 of the basket. In various embodiments, the net liner is attached to end rail 114, and/or side rails 102 and/or 104, and/or middle rail 116, and/or transverse support bars 140-145, or any combination thereof.

According to an embodiment, the net liner is strong enough to withstand a large person (e.g. about 300 pounds) when standing or leaning on the net liner. The net liner provides additional safety to the rescue survivors in the basket.

According to an embodiment, the rescue basket includes a mesh liner along the sides of the basket. The mesh liner can act as an additional barrier for the sides of the basket. The mesh liner can be the same or like the material used to form the bottom net liner 200, or the mesh liner can be a light-weight mesh. In various embodiments, on one side of the basket, a mesh liner stretches from vertical support tube 131 to vertical support tube 133, or to the vertical perimeter of side rail 104 at the second end 108 of the basket, or from the vertical perimeter of side rail 104 at first end 106 of the basket to the vertical perimeter of side rail 104 at the second end 108 of the basket. Similarly, a mesh liner stretches on the other side of the basket from vertical support tube 135 to vertical support tube 137, or to the vertical perimeter of side rail 102 at the second end 108 of the basket, or from the vertical perimeter of side rail 102 at the first end 106 of the basket to the vertical perimeter of side rail 104 at the second end 108 of the basket.

According to various embodiments, the rescue basket frame provides about 15 to 40 cubic feet of volume, about 18 to 40 cubic feet, about 18 to 30 cubic feet, or about 20 to 25 cubic feet of volume.

Buoyancy is another technical aspect of the present rescue basket design. From the time the basket hits the water to when the victim has climbed in and their ascent begins, flotation devices (e.g. floats) will keep the basket at a desired flotation level and keep the passenger(s) from falling below the water line. The floats not only keep the basket from sinking, but they also serve to stabilize the basket as the rough seas knock and tilt the frame and passenger.

According to various embodiments, the floats are constructed of a polyethylene material and the like, such as ETHAFOAM™. Polyethylene provides a flexible, closed-cell, extruded material that works well due to its low density, high impact resistance and closed air cells. In some embodiments, the floats are covered in a protective material, such as ballistic nylon, to protect the foam and provide additional structural integrity to the floats. In some embodiments, the floats are constructed with a cover material having a zipper for ease or removal or inspection and replacement purposes. The cover material may be of any color, but the more visible colors, such as orange may be preferable. The cover material may also include reflective material, such as reflective tape to aid in the visibility of the rescue basket during night time operations in tandem with the rescue helicopters spotlight.

Figure 5A:
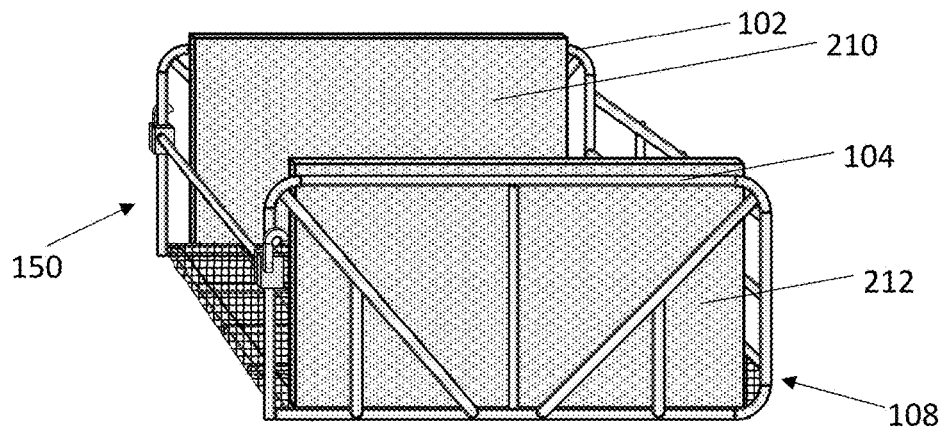
FIGS. 5A, 5B and 5C are perspective views of a rescue basket having buoyancy materials according to exemplary embodiments of the present invention.
Figure 5B:
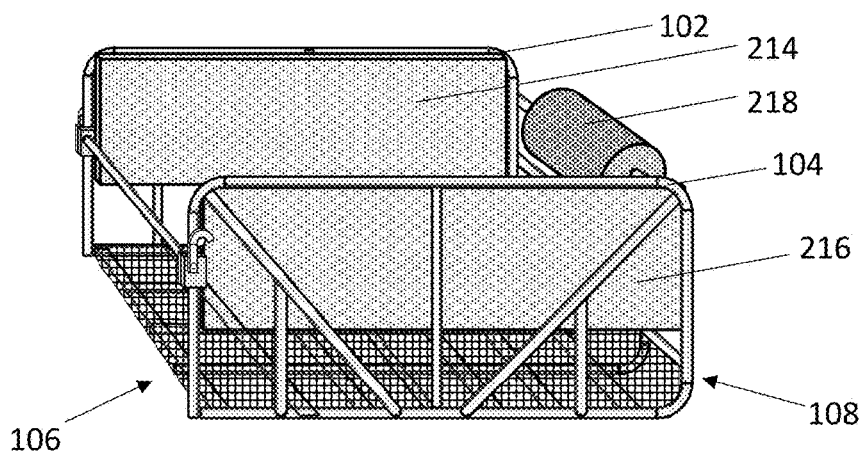
Figure 5C:
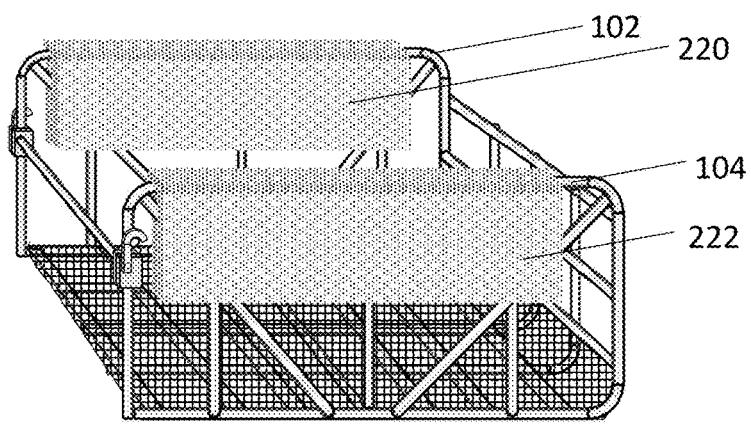

According to various embodiments, the floats have a generally rectangular shape, as shown in FIG. 5A-5C. In some embodiments, the rescue basket has one or more floats, such as two floats 210 and 212 positioned along each side of the basket. The frame itself acts as a support for the floats. In some embodiments, floats 210, 212 are designed to extend above the top perimeter of side rails 102, 104. This tall design helps to keep body parts contained within the basket frame. According to embodiments, a float can extend about 0.5 to 2 inches, or about 1 inch, above the top perimeter of side rails 102, 104.

The float design and arrangement on the sides of the basket also provides extra safety by preventing limbs and other body parts from extending outside the basket frame and perhaps making contact with the side of the helicopter on the way up to the cabin of the helicopter, and can reduce or eliminate the possibility of a passenger (such as a small child or a pet) from falling through and out of the basket.

In other exemplary embodiments, floats 214 and 216 do not extend above the top perimeter of side rails 102, 104, or extend only partially along the sides of the rescue basket. In an exemplary embodiment, floats 214, 216 extend up the sides of the rescue basket to, but not beyond, the top perimeter of side rails 102, 104. In another exemplary embodiment, floats 214, 216 extend only partially along the sides of the rescue basket and do not extend down to the bottom perimeter of the side rails 102, 104.

According to various embodiments, the floats can be positioned inside the basket frame or outside of the basket frame. In an embodiment shown in FIG. 5C, floats 220 and 222 are positioned to straddle or sandwich the sides of the basket frame, with floats positioned both inside and outside the sides of the basket frame. Floats 220, 222 can also cover the top perimeter of the basket frame side rails 102, 104. The floats are attached to the basket frame by any conventional means.

The thickness of the floats is generally not limited, but can be determined based on the desired amount of buoyancy delivered to the basket, both while empty and while carrying a passenger load. Also the thickness of the floats can be considered in regard to the reduction in the internal volume of the basket for the passengers. In various embodiments, the floats have a thickness of about 1 to 3 inches, or about 1.5 to 2 inches. In various embodiments the floats have a total volume of about 0.7 to 3.0 cubic feet, 1.0 to 2.5 cubic feet, 1.0 to 2.0 cubic feet, or about 1.3 cubic feet of volume.

In various embodiments, the rescue basket includes a third float 218, positioned at the second end 108 of the basket (opposite to the first end 106 having the door mechanism). In one embodiment, third float 218 is cylindrical in shape, like that shown in FIG. 5B. In various embodiments, third float 218 is mounted on end rail 110. The third float 218 can assist with the trim of the basket in the water, and also act as a cushion for survivors. In other exemplary embodiments, third float 218 is generally rectangular, like that of floats 214, 216, and is positioned inside the basket supported by the frame, such as supported by end rails 110, 112 and/or 114, or third float 218 is positioned to straddle or sandwich one or more end rails 110, 112 and/or 114 of the basket frame, with float positioned both inside and outside of the basket frame, like that of floats 220, 222.

The buoyancy of the rescue basket is designed to have a desired center of buoyancy to maintain stability, while also increasing the number of degrees that the basket can flip and still recover. The desired buoyancy for the rescue basket provides the passengers and rescuers with the easiest and most efficient steps for loading the passengers into the basket when in the water. According to various embodiments, the rescue basket will sit in the water, when empty and not loaded with passengers, at a level in which the bottom of the basket is submerged about 1-12 inches below the surface of the water, or about 2-10 inches, or about 3-8 inches, or about 5-6 inches below the surface of the water.

The present rescue basket is designed to contain and hold two full-sized adults. Previous rescue baskets designed for a single person will generally weigh about 26 pounds in the water (about 39 pounds out of the water) and have about 16 pounds of reserve buoyancy. According to various embodiments, the present rescue basket weighs about 26-40 pounds in the water, about 30-40 pounds, or about 36 pounds in the water. In various embodiments, the present rescue basket has a higher reserve buoyancy, such as 20-100 pounds of reserve buoyancy, or about 30-80 pounds, or about 60-80 pounds, or about 40-50 pounds of reserve buoyancy.

Various embodiments of the present rescue basket hold two full-sized adults, but weigh about as much as or slightly more than a basket designed for a single person. According to various embodiments, the present rescue basket weighs about 35 to 70 pounds out of the water, or about 40 to 60 pounds, or about 45 to 55 pounds. The rescue basket may weigh less than 35 pounds with the development or substitution of lighter structural materials, such as carbon fiber. According to embodiments, the rescue basket supports two full-sized adults, and at least 600 pounds, and has enough buoyancy to keep their head and at least part of their neck out of the water.

The present rescue basket is also designed to be self-righting in the water, which provides additional safety for the passenger(s) inside the basket. According to various embodiments, the basket can be self-righting when tipped to greater than 90 degrees of list, such as when tipped from 90 degrees up to about 180 degrees of list, or about 140 degrees of list.

The buoyancy of the present rescue basket and the design and placement of the floats provides stability to the basket and a low capacity to tip longitudinally when in the water. According to various embodiments, the present rescue basket largely resists longitudinal tipping and remains generally flat in the water. According to various embodiments, the present rescue basket includes an open first end (106) with a door mechanism that allows that end of the basket to be "open" or "closed". By virtue of having an open end, the present rescue basket has less of a need for, or may not require, that the basket be tipped longitudinally in order to easily and quickly load passengers into the basket.

According to other embodiments, the buoyancy of the rescue basket is such that a rescuer can tip or push the first end (106) of the basket down in the water in order to assist in loading a passenger into the basket. According to embodiments, the basket is relatively "bottom heavy", for instance due to the transverse support bars (140-145), and has a center of buoyancy that causes the basket to naturally return to its original, relatively flat position in the water.

According to various embodiments, the present rescue basket can also be used for land rescues. In an embodiment, the rescue basket does not include flotation devices. In an exemplary embodiment, the rescue basket includes a non-skid material on the bottom of the basket to help prevent sliding on rooftops or mountainous terrain.

According to various embodiments, the rescue basket includes a means for fastening the basket to the cabin of the helicopter. In some embodiments, the helicopter has removable fasteners configured to fasten to the basket frame. The removable fasteners are on the side of the helicopter cabin door or on the deck of the cabin. In some embodiments, the basket includes removable fasteners configured to fasten to structural elements within the helicopter cabin. In an embodiment, the removable fastener is a carabiner or the like. Temporarily fastening the basket when it comes to the cabin of a helicopter allows a flight mechanic or rescuer to have both hands free for aiding the passenger out of the basket.

In an embodiment, the removable fasteners are configured to leave the basket about half inside the cabin and half outside; the basket is fastened to the helicopter with the open end of the basket (the door end) inside the cabin. The flight mechanic can then raise the crossbar, and raise the hoist slightly to make the basket act as a slide to slide the passenger out of the basket. In some embodiments, the fasteners are configured to fasten the open end of the basket to the helicopter at the cabin, while the basket, or at least a portion of the basket, remains outside the helicopter. These embodiments allow more room in the cabin and reduce the time it takes to remove a passenger from the basket. In an embodiment, the rescue basket includes a sliding platform to make it easier and faster to remove an injured passenger from the basket.

According to various embodiments, methods of water rescue are performed by providing a rescue basket on board of a helicopter, attaching the rescue basket to a cable associated with a hoist on the helicopter, lowering the rescue basket from the helicopter into the water near the rescuees, loading one or more rescuees into the rescue basket through an open end of the basket, sliding a crossbar along a frame of the basket to close the open end of the basket, and hoisting the rescue basket containing the rescuees up and into the helicopter. In some embodiments of the method, two rescuees are loaded into the rescue basket before hoisting the basket up to the helicopter.

In use under water-rescue conditions, an embodiment of the present rescue basket is lowered by way of a cable and hoist from a helicopter into the water near the rescuees, the basket being lowered until the cable becomes slack and the basket is floating. At least some of the basket will be suspended below the water surface (e.g. the bottom of the basket and a portion of the sides). One or more passengers are loaded into the basket either through the open door end of the basket, or loaded over the side of the basket, and the basket is hoisted back up and to the helicopter cabin. The one or more passengers are then unloaded and the basket can quickly return to the water for additional rescue operations.

According to an embodiment, the entire rescue basket is brought into the helicopter cabin before unloading the one or more passengers. In other embodiments, the open end of the basket (the door end) of the rescue basket is brought into the helicopter cabin and the rest of the basket remains outside the helicopter. In one embodiment, the basket is then fastened to the helicopter with one or more removable fasteners, and the one or more passengers are unloaded. In an embodiment, the open end of the basket is fastened to the helicopter at the cabin, and the rest of the basket, or at least a portion of the basket, remains outside the cabin. The basket remains supported by the cable and hoist. The one or more passengers are then unloaded. In an embodiment, the hoist is raised slightly to make the basket act as a slide to slide the one or more passengers out of the basket. The one or more fasteners are then removed and the basket is free to return to the water for additional rescue operations.

According to various embodiments of the rescue method, one or more rescuees are loaded into the rescue basket through an open door at the first end of the basket, and the door is adjusted to at least partially close the first end of the basket. In an embodiment, the door is a crossbar that slides along the frame of the basket. In another embodiment of the method, one or more rescuees are loaded into the rescue basket over the side of the basket.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Spatially relative terms, such as "top", "bottom", "end", "side", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. Similarly, the terms "up", "down", "vertically", "horizontally" and the like are used herein for the purpose of explanation only unless specifically indicated otherwise.

Although the terms "first" and "second" may be used herein to describe various features these features should not be limited by these terms, unless the context indicates otherwise. These terms may be used to distinguish one feature from another feature. Thus, a first feature discussed herein could be termed a second feature, and similarly, a second feature discussed below could be termed a first feature without departing from the teachings of the present invention.

Although various illustrative embodiments are described above, any of a number of changes may be made to various embodiments without departing from the scope of the invention as described by the claims. Optional features of various device and system embodiments may be included in some embodiments and not in others. Further, the particular features, structures or characteristics may be combined in any suitable manner in one or more embodiments. Therefore, the foregoing description is provided primarily for exemplary purposes and should not be interpreted to limit the scope of the invention as it is set forth in the claims.

The examples below are intended to further illustrate various embodiments of the disclosure. These examples are not intended to limit the scope of the claims. While these examples are provided for explanatory purposes, these should not be considered the only examples. Additional examples can be apparent based on the teachings of the present disclosure.

Example 1

A rescue basket according to the present embodiments was tested in a training facility with simulated rotor wash and hoist. The testing included both single-person and two-person rescue hoists. To simulate the methods used in actual rescues, both victims started approximately five yards away from the basket, and the rescue swimmer swam back to get each victim individually. This simulated multiple victims being staged in a nearby life raft. Loading methods utilizing the door mechanism with victims facing both forward and backward in the basket were carried out. Trials were also carried out with the door (crossbar) remaining in the up position, loading victims over the sides of the rescue basket.

Data: With one victim, it took about 20 seconds to load, both utilizing the door (open end loading) and not utilizing the door (side loading). With two victims, it took about 45 seconds to load, including the time for the swimmer to go back to the simulated life raft to retrieve and load the second victim. This data verified the overall function of the basket, including the smooth sliding of the door, the door locking mechanism, the load capacity and the proper amount and distribution of buoyancy.

Figure 6:
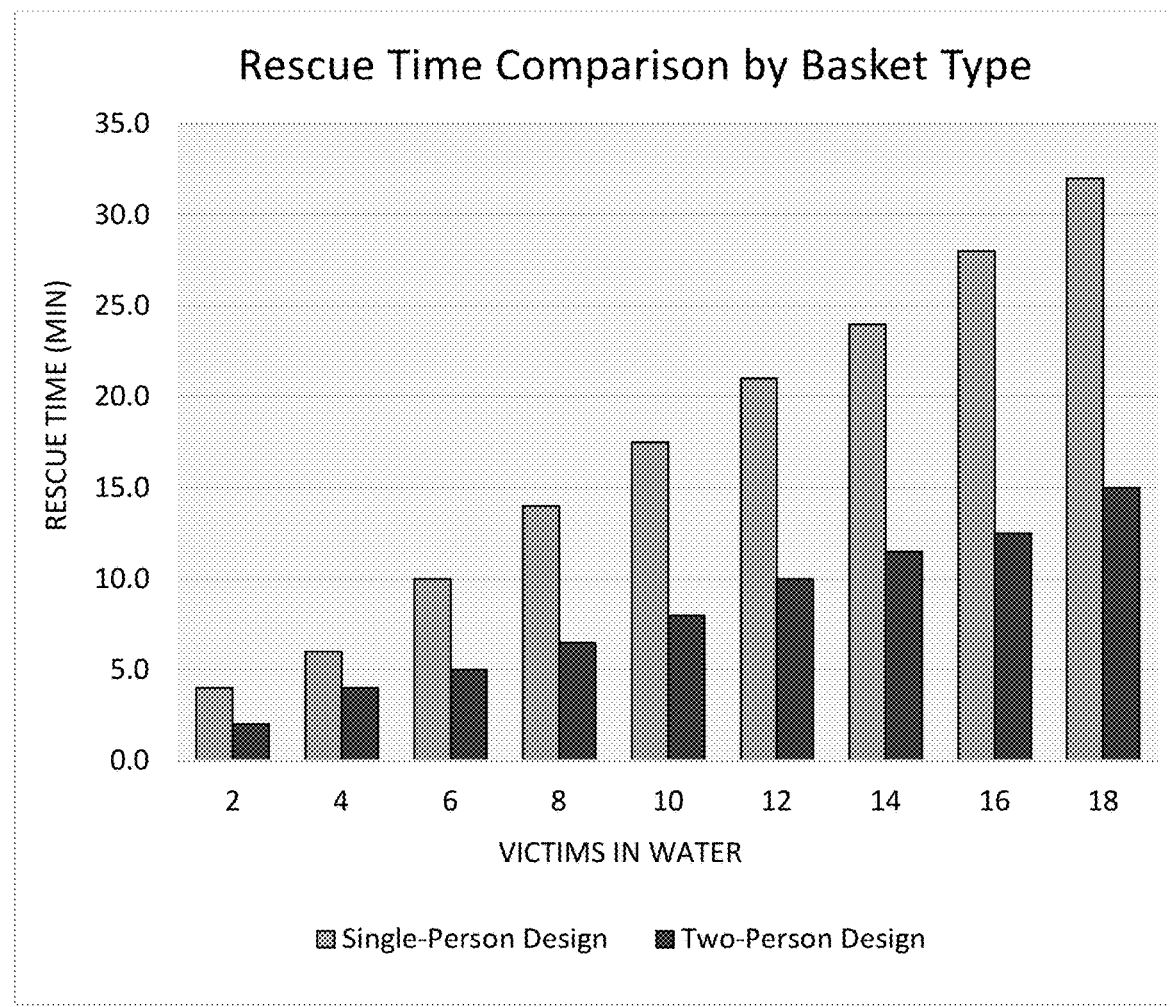
FIG. 6 is a graph demonstrating the improved rescue time provided by an exemplary embodiment of the present invention (Two-Person Design) compared to a rescue basket existing in the art (Single-Person Design).

The collected data was compared to video analysis of rescues utilizing a single person rescue basket existing in the art, such as the basket shown in FIG. 1. FIG. 6 shows the amount of time that is saved by using the present two-person rescue basket as described by embodiments in the present disclosure, compared to the single person rescue basket existing in the art. With 18 people in the water, the on-scene rescue time was reduced from 32 minutes to 15 minutes.

Example 2

To test the load strength of the present rescue basket, the basket was loaded up to 700 pounds, which is greater than the 600 pound specification for a two-person basket, and hoisted for ten minutes. No plastic deformation was observed at any point on the frame.

Example 3

The rescue basket according to an exemplary embodiment of the present invention was tested with the hoist of an MH-60 helicopter. Quantitative data was gathered for the unloading of passengers from the basket into the helicopter, and it was determined that it took about 15 seconds to unload each passenger, using the door mechanism. The testing also confirmed that the hoist of an MH-60 helicopter can lift two passengers and the basket effectively. The testing further confirmed that the rescue basket can be stowed in the helicopter in the same location as a currently used basket, as well as in a configuration placing it aft of the co-pilot's seat to save even more space.

Figure 7:
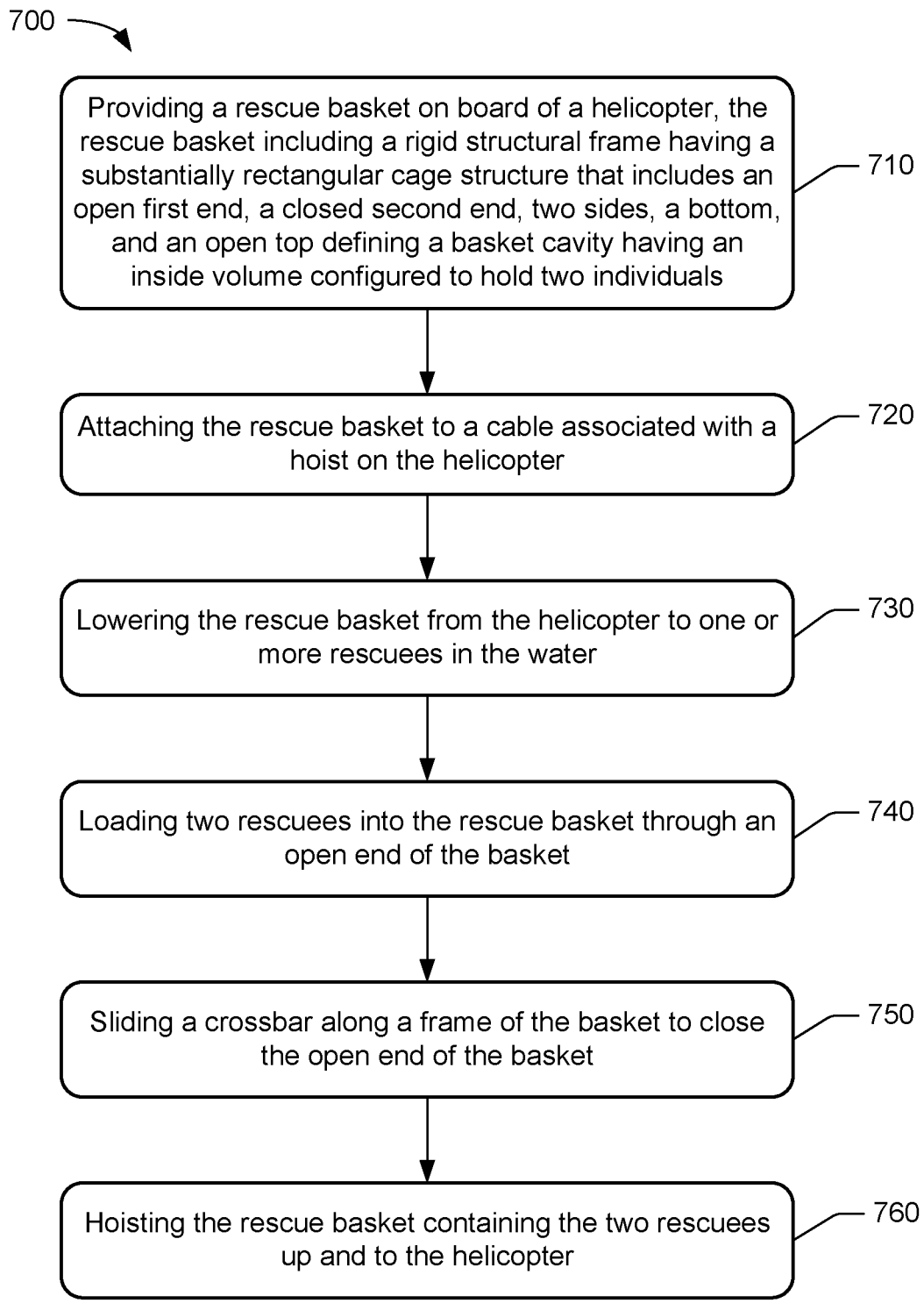
FIG. 7 is a flow diagram illustrating an example of a method of performing a water rescue.

FIG. 7 is a flow diagram 700 illustrating an example of a method of performing a water rescue. In step 710, a rescue basket is provided on board of a helicopter. The rescue basket includes a rigid structural frame having a substantially rectangular cage structure that includes an open first end, a closed second end, two sides, a bottom, and an open top defining a basket cavity having an inside volume configured to hold two individuals. In step 720, the rescue basket is attached to a cable associated with a hoist on the helicopter. In step 730, the rescue basket is lowered from the helicopter to one or more rescuees in the water. In step 740, two rescuees are loaded into the rescue basket through an open end of the basket. Step 750 involves sliding a crossbar along a frame of the basket to close the open end of the basket. Step 760 involves hoisting the rescue basket containing the two rescuees up and to the helicopter.

What is claimed is:

1. A rescue basket, comprising:
   a rigid structural frame having a substantially rectangular cage structure that includes an open first end, a closed second end, two sides, a bottom and an open top defining a basket cavity having an inside volume configured to hold two full sized individuals, the sides of the frame comprising one or more diagonal support tubes extending diagonally between the bottom perimeter of the frame and the top perimeter of the frame, each of the diagonal support tubes being attached to a corresponding vertical support tube extending, from a first location at a mid-portion of each said diagonal support tube, the mid-portion disposed away from both the top perimeter and the bottom perimeter, to a second location at the bottom perimeter of the frame;
   a door mechanism at the open first end of the frame, comprising a crossbar that slides along the frame and extends across the open first end to at least partially close off the first end when in a closed position; and
   a flotation system adapted to keep the basket afloat and maintain the basket at a predetermined flotation level when in water.

2. The rescue basket of claim 1, wherein the predetermined flotation level is a level in which the bottom of the frame is submerged about 1-12 inches below the surface of the water when the basket is not loaded with passengers.

3. The rescue basket of claim 1, wherein the structural frame further comprises:
   a pair of rectangular side rails that define a periphery of the frame, each of the side rails extending vertically up an end perimeter of the first end of the frame, horizontally along a top perimeter of the frame, vertically down an end perimeter of a second end of the frame, and horizontally along a bottom perimeter of the frame back to the first end;
   one or more end rails at the second end spanning horizontally between the pair of side rails; a middle side rail extending vertically up each side of the frame, and positioned perpendicular to the horizontal top and bottom perimeter portions of the side rails;
   one or more bottom runners extending longitudinally along the length of the bottom of the frame; and
   a plurality of transverse support bars extending across the width of the bottom of the frame, and spanning between the pair of side rails.

4. The rescue basket of claim 3, wherein the door mechanism comprises bushings contained within a housing at each end of the crossbar, each housing straddling the vertical portion of the side rail at the first end, the bushings configured to allow the crossbar to slide along the side rails.

5. The rescue basket of claim 1, wherein the door mechanism comprises one or more latches configured to lock the crossbar in a closed position across the first end of the frame.

6. The rescue basket of claim 1, wherein the door mechanism comprises a hook, connected to an end of the crossbar and configured to engage a post on the frame in the closed position.

7. The rescue basket of claim 1, wherein the flotation system comprises one or more floats, the floats having a rectangular shape, the floats being positioned along each of the two sides of the basket.

8. The rescue basket of claim 7, wherein the flotation system further comprises a float positioned at the second end of the basket.

9. The rescue basket of claim 1, wherein the flotation system provides a reserve buoyancy of 30-80 pounds.

10. The rescue basket of claim 1, wherein the flotation system provides a buoyancy such that the basket is self-righting when tipped to greater than 90 degrees of list.

11. The rescue basket of claim 1, wherein the basket frame provides greater than 15 cubic feet of volume.

12. The rescue basket of claim 1, wherein the basket can lift at least 600 pounds of weight.

13. The rescue basket of claim 1, wherein the inside angle formed by the diagonal support tube and the bottom perimeter of the frame is about 45 degrees, and the inside angle formed by the diagonal support tube and the vertical support tube is about 45 degrees.

14. The rescue basket of claim 1, further comprising a mesh netting material attached to the bottom of the frame at the open first end and attached to the crossbar, such that when the crossbar is raised to the closed position, the mesh netting material is extended and/or stretched to cover the open first end.

15. The rescue basket of claim 1, further comprising one or more removable fasteners.

16. The rescue basket of claim 1, wherein the structural frame further comprises:
   a first middle side rail extending vertically up a first side of the frame between the top perimeter and the bottom perimeter of the frame; and
   a second middle side rail extending vertically up a second side of the frame between the top perimeter and the bottom perimeter of the frame;
   wherein a first diagonal support tube extends diagonally between the bottom perimeter and the top perimeter of the frame on one side of the first middle side rail, a first vertical support tube extending from the mid-portion of the first diagonal support tube to the bottom perimeter of the frame, and a second diagonal support tube extends diagonally between the bottom perimeter and the top perimeter of the frame on another side of the first middle side rail, a second vertical support tube extending from the mid-portion of the second diagonal support tube to the bottom perimeter of the frame; and
   wherein a third diagonal support tube extends diagonally between the bottom perimeter and the top perimeter of the frame on one side of the second middle side rail, a third vertical support tube extending from the mid-portion of the third diagonal support tube to the bottom perimeter of the frame and a fourth diagonal support tube extends diagonally between the bottom perimeter and the top perimeter of the frame on another side of the second middle side rail, a fourth vertical support tube extending from the mid-portion of the fourth diagonal support tube to the bottom perimeter of the frame.

17. The rescue basket of claim 16, wherein:
   the first middle side rail is disposed in a middle of the first side of the top perimeter and the bottom perimeter of the frame;
   the first diagonal support tube with the first vertical support tube and the second diagonal support tube with the second vertical support tube are mirror images of one another on opposite sides of the first middle side rail;
   the second middle side rail is disposed in a middle of the second side of the top perimeter and the bottom perimeter of the frame; and
   the third diagonal support tube with the third vertical support tube and the fourth diagonal support tube with the fourth vertical support tube are mirror images of one another on opposite sides of the second middle side rail.

18. A method of performing a water rescue, comprising:
   providing a rescue basket on board of a helicopter;
   attaching the rescue basket to a cable associated with a hoist on the helicopter;
   lowering the rescue basket from the helicopter to one or more rescuees in the water;
   loading two rescuees into the rescue basket through an open end of the basket;
   sliding a crossbar along a frame of the basket to close the open end of the basket; and
   hoisting the rescue basket containing the two rescuees up and to the helicopter;
   wherein the rescue basket comprises a rigid structural frame having a substantially rectangular cage structure that includes an open first end, a closed second end, two sides, a bottom and an open top defining a basket cavity having an inside volume configured to hold two full sized individuals, the sides of the frame comprising one or more diagonal support tubes extending diagonally between the bottom perimeter of the frame and the top perimeter of the frame, each of the diagonal support tubes being attached to a corresponding vertical support tube extending from a first location at a mid-portion of each said diagonal support tube, the mid-portion disposed away from both the top perimeter and the bottom perimeter, to a second location at the bottom perimeter of the frame.

19. The method of claim 18, wherein the rescue basket comprises:
   a door mechanism at the open first end of the frame, comprising a crossbar that slides along the frame and extends across the open first end to at least partially close off the first end when in a closed position; and
   a flotation system adapted to keep the basket afloat and maintain the basket at a predetermined flotation level when in water.

20. The method of claim 18, further comprising fastening the hoisted rescue basket containing the two rescuees to the helicopter, and unloading the rescuees.

21. The method of claim 20, wherein the open end of the hoisted rescue basket is fastened to the helicopter and at least a portion of the basket remains outside the helicopter.

22. The method of claim 18, wherein the rescue basket comprises:
   a first middle side rail extending vertically up a first side of the frame between the top perimeter and the bottom perimeter of the frame; and
   a second middle side rail extending vertically up a second side of the frame between the top perimeter and the bottom perimeter of the frame;
   wherein a first diagonal support tube extends diagonally between the bottom perimeter and the top perimeter of the frame on one side of the first middle side rail, a first vertical support tube extending from the mid-portion of the first diagonal support tube to the bottom perimeter of the frame, and a second diagonal support tube extends diagonally between the bottom perimeter and the top perimeter of the frame on another side of the first middle side rail, a second vertical support tube extending from the mid-portion of the second diagonal support tube to the bottom perimeter of the frame; and
   wherein a third diagonal support tube extends diagonally between the bottom perimeter and the top perimeter of the frame on one side of the second middle side rail, a third vertical support tube extending from the mid-portion of the third diagonal support tube to the bottom perimeter of the frame and a fourth diagonal support tube extends diagonally between the bottom perimeter and the top perimeter of the frame on another side of the second middle side rail, a fourth vertical support tube extending from the mid-portion of the fourth diagonal support tube to the bottom perimeter of the frame.

23. The method of claim 22, wherein:
the first middle side rail is disposed in a middle of the first side of the top perimeter and the bottom perimeter of the frame;
the first diagonal support tube with the first vertical support tube and the second diagonal support tube with the second vertical support tube are mirror images of one another on opposite sides of the first middle side rail;
the second middle side rail is disposed in a middle of the second side of the top perimeter and the bottom perimeter of the frame; and
the third diagonal support tube with the third vertical support tube and the fourth diagonal support tube with the fourth vertical support tube are mirror images of one another on opposite sides of the second middle side rail.

* * * * *